(12) United States Patent
Seo (10) Patent No.: US 12,540,871 B2
(45) Date of Patent: Feb. 3, 2026

(54) FORCE SENSOR DEVICE FOR DETECTING A MOMENT AROUND A PREDETERMINED AXIS

(71) Applicant: MINEBEA MITSUMI Inc., Nagano (JP)

(72) Inventor: Yuki Seo, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 339 days.

(21) Appl. No.: 18/181,096

(22) Filed: Mar. 9, 2023

(65) Prior Publication Data

US 2023/0314244 A1 Oct. 5, 2023

(30) Foreign Application Priority Data

Mar. 30, 2022 (JP) .................. 2022-056924

(51) Int. Cl.
*G01L 1/22* (2006.01)
(52) U.S. Cl.
CPC .................. *G01L 1/2225* (2013.01)
(58) Field of Classification Search
CPC ........ G01L 1/2225; G01L 5/161; G01L 5/165
See application file for complete search history.

(56) References Cited

U.S. PATENT DOCUMENTS

| 2003/0140713 | A1* | 7/2003 | Ohsato ..................... G01L 5/162 73/862.041 |
| 2007/0006668 | A1 | 1/2007 | Hirabayashi et al. |
| 2018/0313866 | A1 | 11/2018 | Yamaguchi et al. |
| 2019/0242768 | A1* | 8/2019 | Sonderegger ........... G01L 5/167 |
| 2022/0299384 | A1* | 9/2022 | Suganumata ......... G01L 3/1478 |
| 2023/0031860 | A1* | 2/2023 | Tanaami ............... G01L 1/2293 |

FOREIGN PATENT DOCUMENTS

| JP | 2001-315082 | 11/2001 |
| JP | 2005-172619 | 6/2005 |
| JP | 2007-010379 | 1/2007 |
| JP | 2012-093213 | 5/2012 |
| JP | 2018-185296 | 11/2018 |
| JP | 2021-004846 | 1/2021 |

OTHER PUBLICATIONS

Office Action mailed on Dec. 2, 2025 with respect to the corresponding Japanese patent application No. 2022-056924.

* cited by examiner

*Primary Examiner* — Natalie Huls
(74) *Attorney, Agent, or Firm* — IPUSA, PLLC (57) ABSTRACT

A force sensor device 1, which is to be coupled to a first coupling counterpart 61 in a direction of a predetermined axis, includes: a sensor chip 110 that detects a moment around the predetermined axis; and a first coupling portion 40 including a first contact face 44, where the first contact face 44 is to face the first coupling counterpart 61 in the direction of the predetermined axis and is to contact the first coupling counterpart 61. An arithmetic average surface roughness Sa of the first contact face 44 is 3.0 or higher.

12 Claims, 8 Drawing Sheets

FORCE SENSOR DEVICE FOR DETECTING A MOMENT AROUND A PREDETERMINED AXIS

CROSS-REFERENCE TO RELATED APPLICATIONS

This application is based on and claims priority to Japanese Patent Application No. 2022-056924, filed on Mar. 30, 2022, the entire contents of which are incorporated herein by reference.

BACKGROUND OF THE INVENTION

1. Field of the Invention

The disclosure herein relates to a force sensor device.

2. Description of the Related Art

A traditionally known force sensor device includes a strain generator of a metal and a sensor element attached to the strain generator. The sensor element of the force sensor device detects elastic deformation of the strain generator occurring by the application of an external force. Thereby, the force sensor device detects forces of multiple axes (see, for example, Patent Documents 1 to 3).

The force sensor device has a contact face with a counterpart to which the force sensor device is to be coupled. When the surface roughness of the contact face is low, sliding may occur on the contact face by the application of a force in a direction along a moment Mz around a Z axis. When the sliding occurs as described above, the force sensor device may output a smaller value than an actual value.

The technique disclosed herein has been achieved in view of the above, and aims to enhance stability of detection precision of a moment Mz around a Z axis.

RELATED-ART DOCUMENTS

Patent Documents

Patent Document 1: Japanese Laid-Open Patent Publication No. 2012-93213
Patent Document 2: Japanese Laid-Open Patent Publication No. 2007-10379
Patent Document 3: Japanese Laid-Open Patent Publication No. 2018-185296

SUMMARY OF THE INVENTION

The present disclosure provides a force sensor device to be coupled to a first part to which the force sensor device is to be coupled (hereinafter the first part will be referred to as a "first coupling counterpart") in a direction of a predetermined axis. The force sensor device includes: a sensor chip that is to detect a moment around the predetermined axis; and a first coupling portion including a first contact face (hereinafter may be referred to simply as a "contact face"), where the first contact face is to face the first coupling counterpart in the direction of the predetermined axis and is to contact the first coupling counterpart. An arithmetic average surface roughness Sa of the first contact face is 3.0 or higher.

DESCRIPTION OF THE EMBODIMENTS

In the following, embodiments of the present invention will be described with reference to the drawings. In the drawings, the same elements are denoted by the same reference numerals and the description thereof may be omitted.

(Axis, Force in a Direction of the Axis, and Moment Around the Axis)

Figure 1:
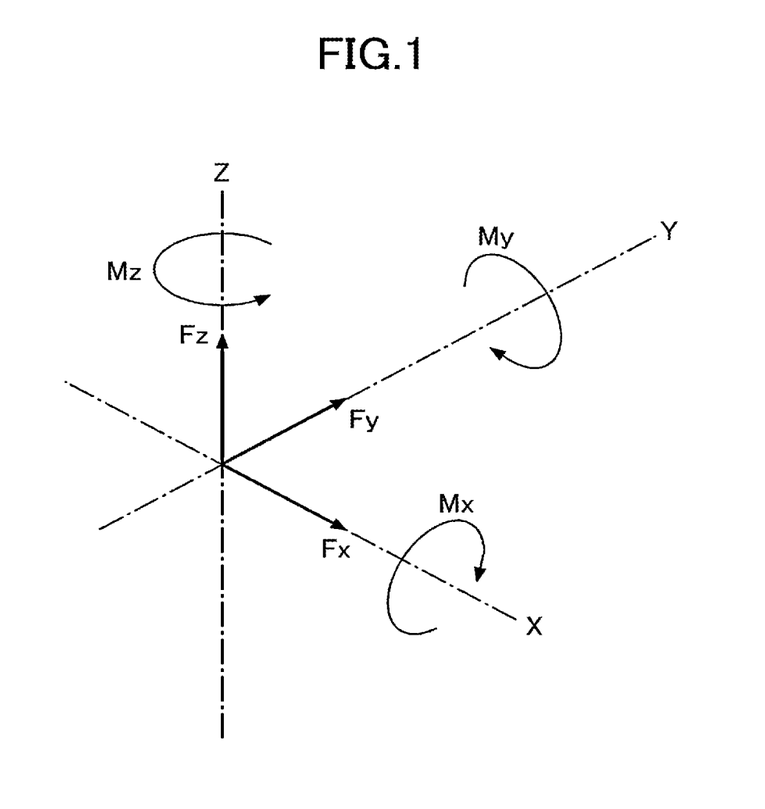
FIG. 1 is a view that illustrates an X axis, a Y axis, and a Z axis, and directions of a force Fx along the X axis, a force Fy along the Y axis, a force Fz along the Z axis, a moment Mx around the X axis, a moment My around the Y axis, and a moment Mz around the Z axis.

First, referring to FIG. 1, an axis, a force in a direction of the axis, and a moment around the axis will be described. FIG. 1 is a view that illustrates an X axis, a Y axis, and a Z axis, and directions of a force Fx along the X axis, a force Fy along the Y axis, a force Fz along the Z axis, a moment Mx around the X axis, a moment My around the Y axis, and a moment Mz around the Z axis. As illustrated in FIG. 1, the X-axis direction, the Y-axis direction, and the Z-axis direction cross each other. The Z axis is one example of the predetermined axis, and the Z-axis direction (i.e., a direction in which the Z axis extends) is one example of the direction of the predetermined axis.

A force sensor device 1 according to the present embodiment can detect the force Fx in the X-axis direction, the force Fy in the Y-axis direction, and the force Fz in the Z-axis direction. As the moment around each axis, the force sensor device 1 can detect the moment Mx around the X axis, the moment My around the Y axis, and the moment Mz around the Z axis. The force Fx in the X-axis direction is one example of displacement in the X-axis direction. The force Fy in the Y-axis direction is one example of displacement in the Y-axis direction. The force Fz in the Z-axis direction is one example of displacement in the Z-axis direction.

In the drawings, the X-axis direction, the Y-axis direction, and the Z-axis direction may be illustrated by arrows. The X-axis direction, the Y-axis direction, and the Z-axis direction come from the force sensor device 1. For example, when a direction in which the force sensor device 1 faces is changed, directions in which the X-axis direction, the Y-axis direction, and the Z-axis direction face are also changed in accordance with the direction in which the force sensor device 1 faces.

(Schematic Configuration of the Force Sensor Device 1)

Figure 2:
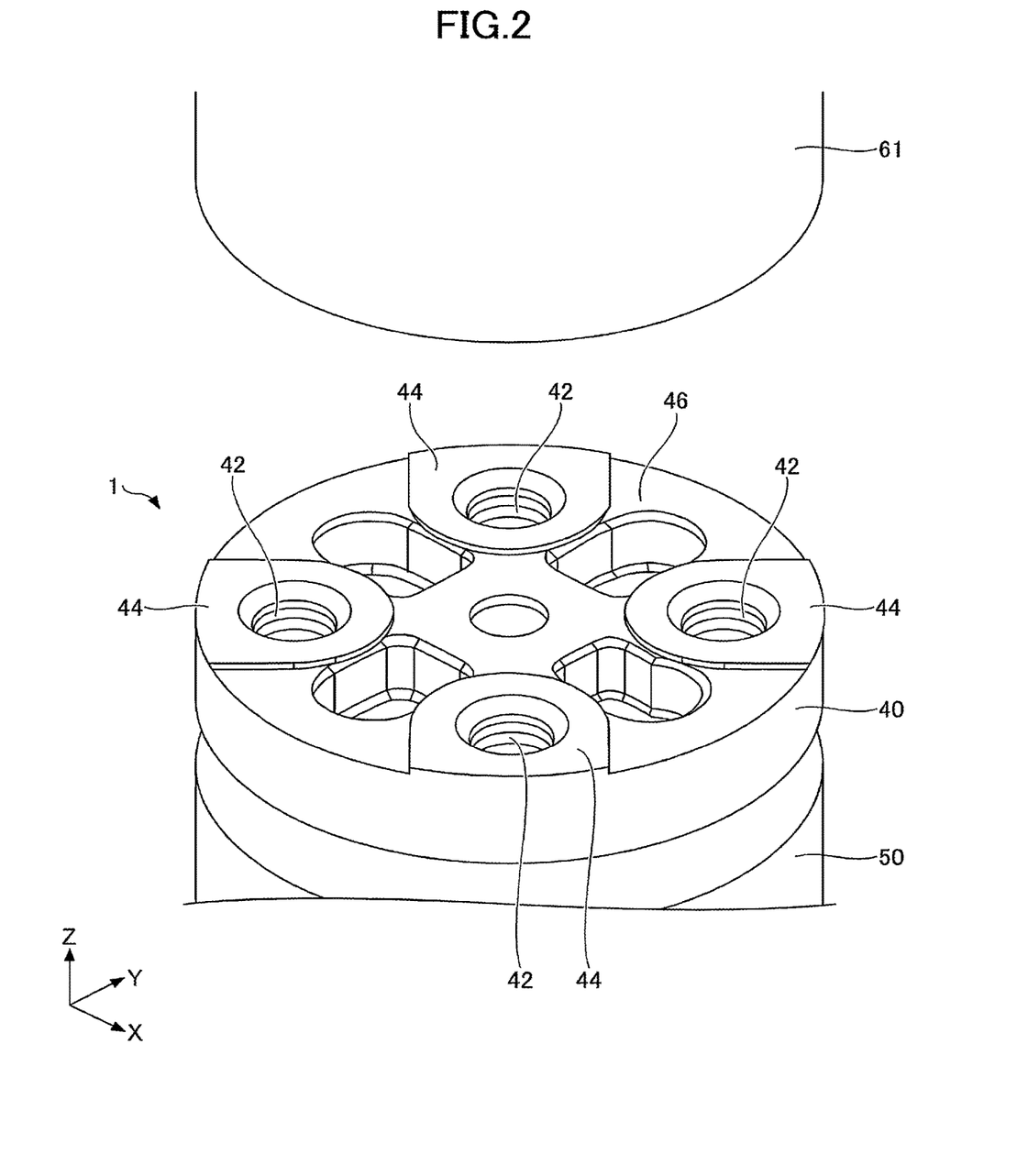
FIG. 2 is a perspective view that illustrates a force sensor device according to an embodiment and the first coupling counterpart.
Figure 3:
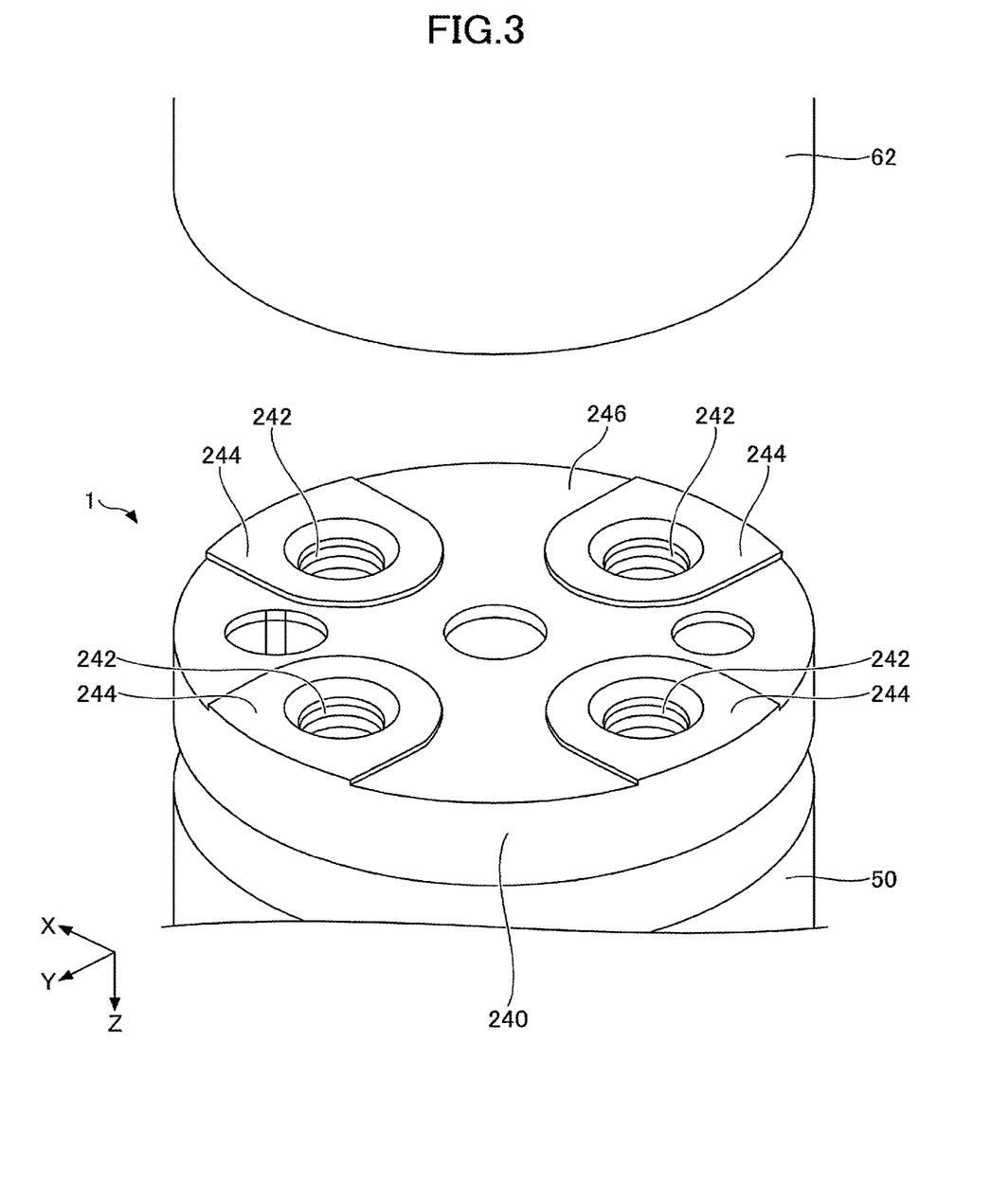
FIG. 3 is a perspective view that illustrates a force sensor device according to an embodiment and a second part to which the force sensor device is to be coupled (hereinafter the second part will be referred to as a "second coupling counterpart").
Figure 4:
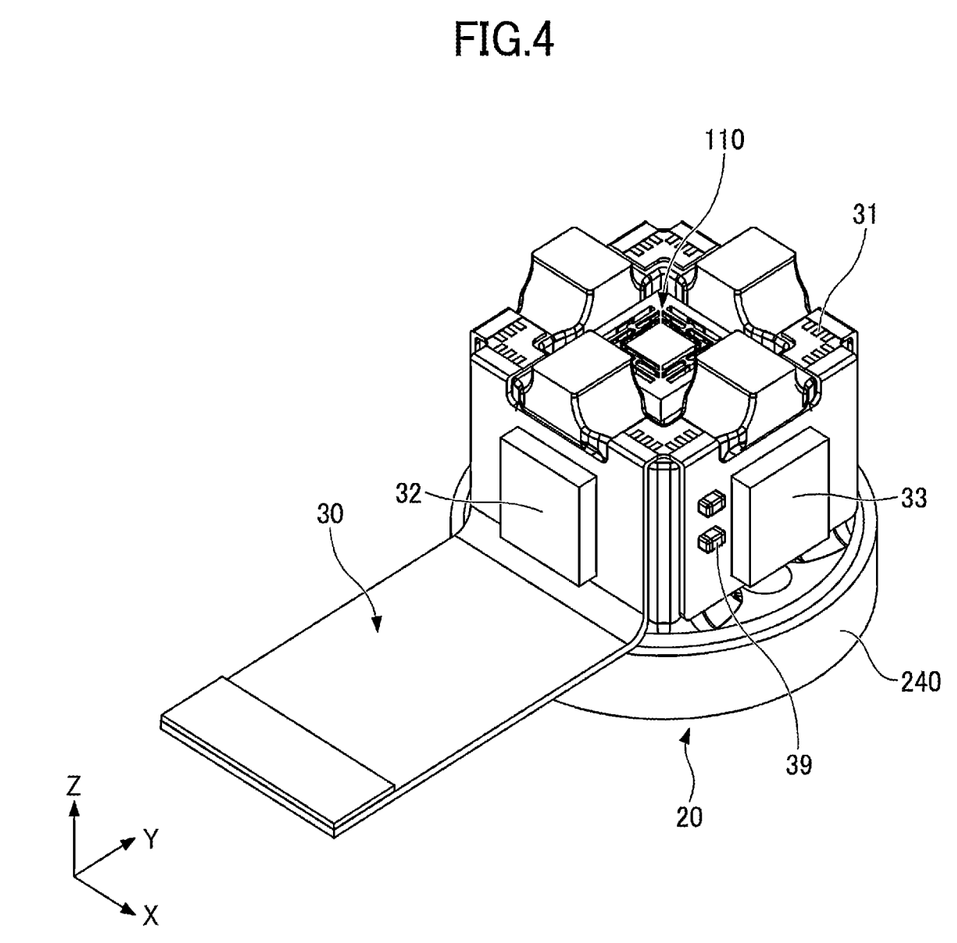
FIG. 4 is a perspective view that illustrates a sensor chip, a flexible substrate, and a strain generator.

FIG. 2 is a perspective view that illustrates the force sensor device according to the embodiment and the first coupling counterpart. FIG. 3 is a perspective view that illustrates the force sensor device according to the embodiment and the second coupling counterpart. FIG. 4 is a perspective view that illustrates a sensor chip, a flexible substrate, and a strain generator.

The force sensor device 1 according to the present embodiment includes a sensor chip 110, a strain generator 20, a flexible substrate 30, a force-receiving portion 40, and a cover 50. The force-receiving portion 40 is one example of the first coupling portion to be coupled to a first coupling counterpart 61. The strain generator 20 includes a coupling portion 240 to be coupled to a second coupling counterpart 62. The coupling portion 240 is one example of a second coupling portion to be coupled to the second coupling counterpart 62. The force sensor device 1 is, for example, a compact force sensor device. The cover 50 forms a hollow cylinder. Part of the strain generator 20 and the sensor chip 110 are housed in the cover 50. The flexible substrate 30 is coupled to the sensor chip 110.

(Force-Receiving Portion)

As illustrated in FIG. 2, the force sensor device 1 is disposed to face the first coupling counterpart 61 in the Z-axis direction. The force-receiving portion 40 of the force sensor device 1 is coupled to the first coupling counterpart 61. The force-receiving portion 40 forms, for example, a disc shape. The force-receiving portion 40 is provided with a plurality of screw holes 42. With screws to be inserted through the screw holes 42, the force-receiving portion 40 is attached to the first coupling counterpart 61.

The top face of the force-receiving portion 40 is provided with a plurality of contact faces 44 that are to contact the first coupling counterpart 61. The top face of the force-receiving portion 40 is disposed at a position apart from the cover 50 in the Z-axis direction. The contact face 44 is one example of the first contact face. The plurality of contact faces 44 are formed around the screw holes 42. The plurality of contact faces 44 are formed as faces that project, along the Z-axis arrow direction, from an attaching face 46 around the contact faces 44. The contact face 44 has a predetermined surface roughness. The predetermined surface roughness of the contact face 44 will be described below. The force-receiving portion 40 can be made of, for example, stainless steel. The force-receiving portion 40 is to be fixed to the strain generator 20 through, for example, welding.

(Coupling Portion)

As illustrated in FIG. 3, the force sensor device 1 is disposed to face the second coupling counterpart 62 in the Z-axis direction. The second coupling counterpart 62 is disposed on the opposite side of the force sensor device 1 to the first coupling counterpart 61, in the Z-axis direction. A coupling portion 240 of the force sensor device 1 is coupled to the second coupling counterpart 62. The coupling portion 240 forms, for example, a disc shape. The coupling portion 240 is provided with a plurality of screw holes 242. With screws to be inserted through the screw holes 242, the coupling portion 240 is attached to the second coupling counterpart 62.

The bottom face of the coupling portion 240 is provided with a plurality of contact faces 244 that are to contact the second coupling counterpart 62. The bottom face of the coupling portion 240 is disposed at a position apart from the cover 50 in the Z-axis direction. The contact face 244 is one example of the second contact face. The plurality of contact faces 244 are formed around the screw holes 242. The plurality of contact faces 244 are formed as faces that project, in the Z-axis direction, from an attaching face 246 around the contact faces 244. The contact face 244 has a predetermined surface roughness. The predetermined surface roughness of the contact face 244 will be described below. The coupling portion 240 can be made of, for example, stainless steel. The coupling portion 240 is made as part of the strain generator 20.

(Sensor Chip)

The sensor chip 110 is, as illustrated in FIG. 4, mounted in the strain generator 20. The sensor chip 110 is adhered to the strain generator 20 on the top-face side thereof so as not to protrude from the strain generator 20. The sensor chip 110 is disposed at a position near the force-receiving portion 40 in the Z-axis direction.

The sensor chip 110 is a micro electro mechanical systems (MEMS) sensor chip that detects six axes with one chip, and is made of a semiconductor substrate such as a silicon on insulator (SOI) substrate. The planar shape of the sensor chip 110 may be, for example, a square where each side is about 3000 μm. Note that, the structure of the sensor chip 110 is well known by patent application filed by the present applicant (Japanese Laid-Open Patent Publication No. 2018-185296) and the like, and thus detailed description therefor will be omitted.

(Flexible Substrate)

The flexible substrate 30 performs input and output of a signal to and from the sensor chip 110. A portion of the flexible substrate 30 at one end thereof is coupled to the sensor chip 110, and disposed in the cover 50. The portion of the flexible substrate 30 at one end thereof is appropriately bent and disposed on the top and side faces of the strain generator 20. Electrodes 31 of the flexible substrate 30 are electrically coupled to the sensor chip 110 through, for example, wire bonding.

The flexible substrate 30 is mounted with active components 32 and 33. The active components 32 and 33 include an IC that converts an electrical analog signal to an electrical digital signal (an AD converter). For example, the active components 32 and 33 convert an analog signal from a bridge circuit that detects forces Fx, Fy, and Fz output from the sensor chip 110, to an electrical digital signal. The flexible substrate 30 is provided with a passive component 39. The passive component 39 includes a resistor and a capacitor that are coupled to the active components 32 and 33.

(Strain Generator)

Figure 5:
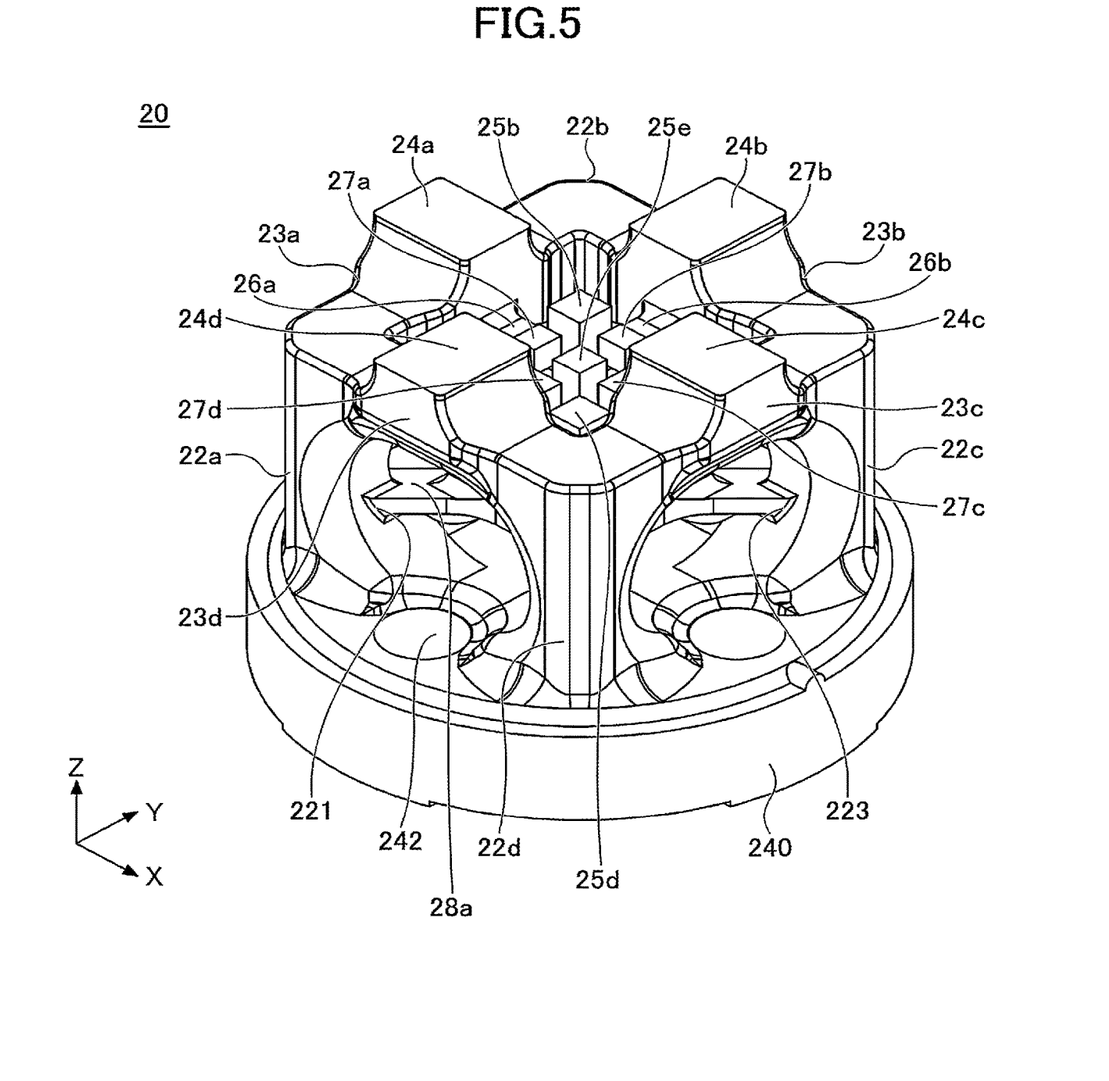
FIG. 5 is a perspective view that illustrates a strain generator of a force sensor device.
Figure 6:
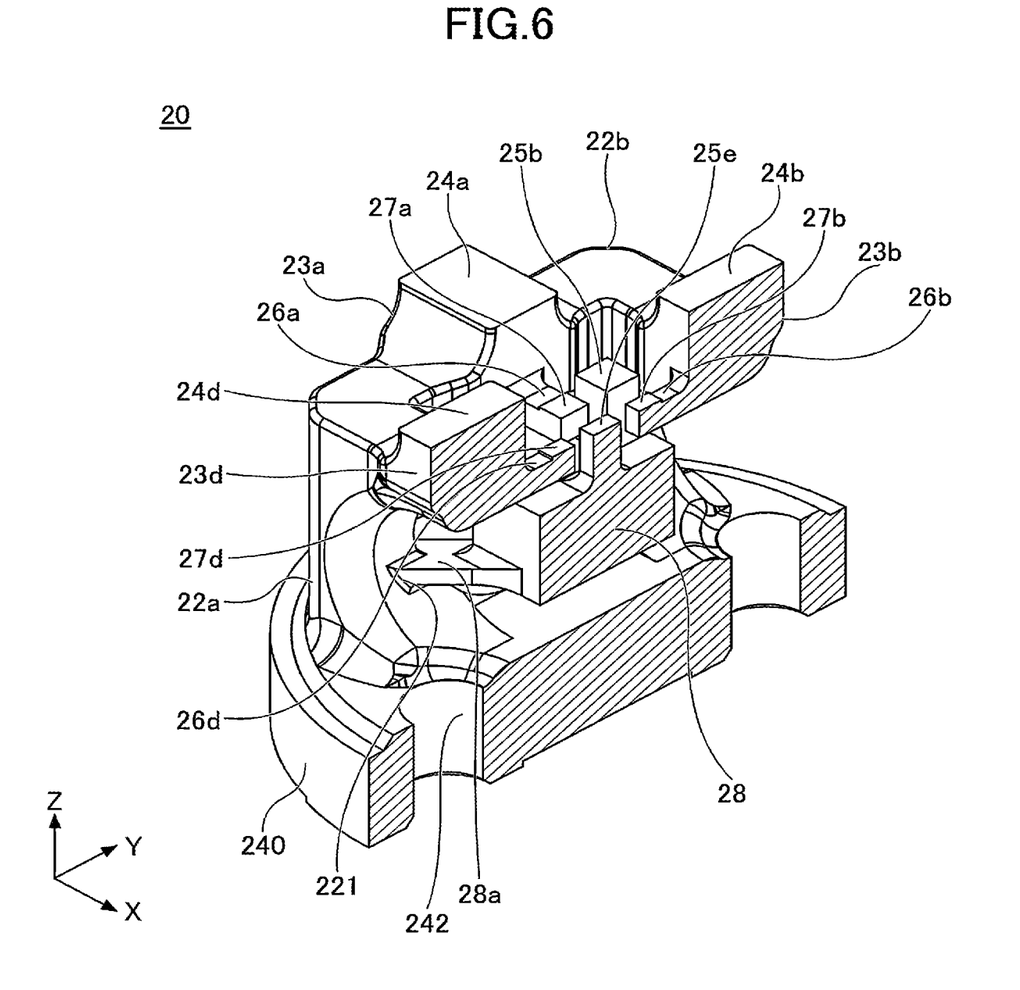
FIG. 6 is a cross-sectional perspective view that illustrates a strain generator of a force sensor device.
Figure 7:
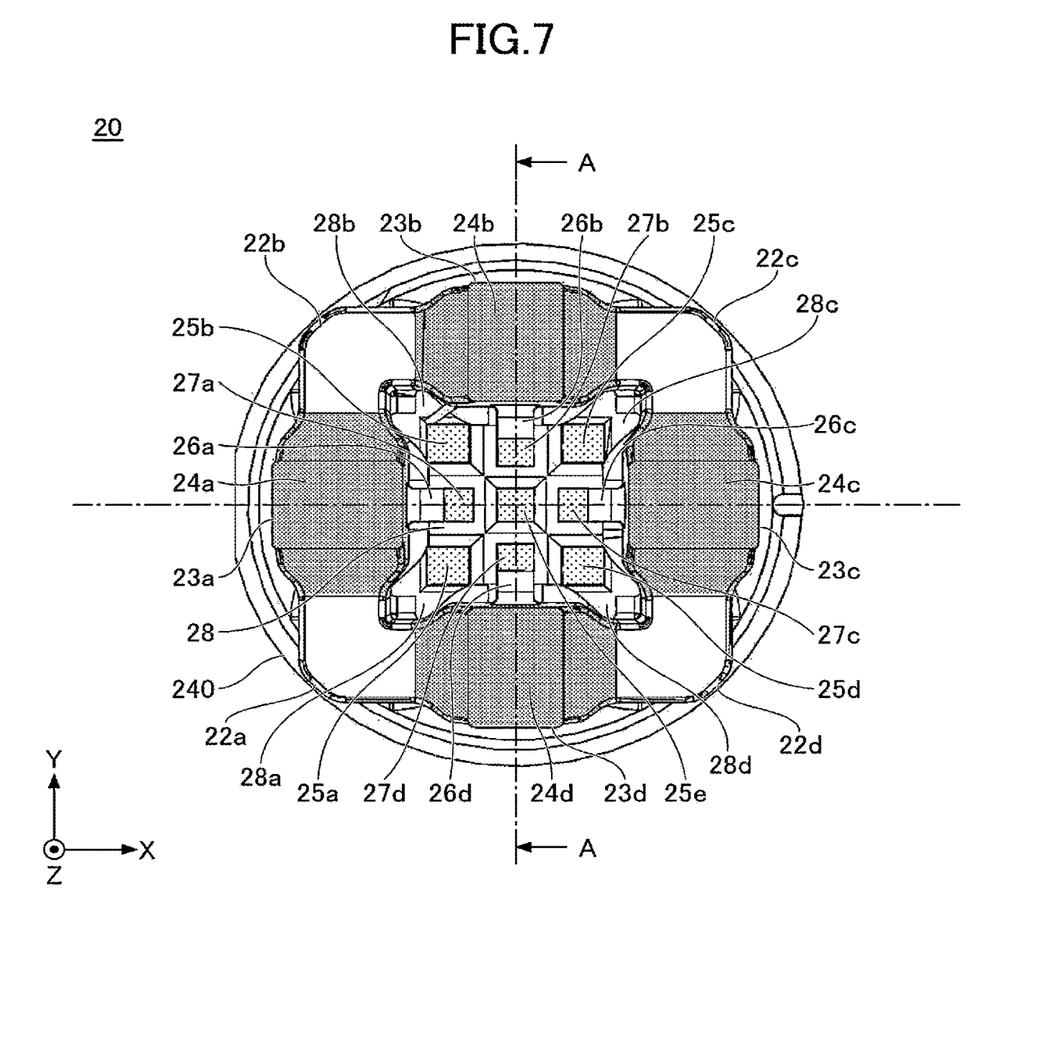
FIG. 7 is a plan view of a strain generator of a force sensor device.

Next, referring to FIG. 4 to FIG. 7, the strain generator 20 will be described. FIG. 5 is a perspective view that illustrates the strain generator of the force sensor device. FIG. 6 is a cross-sectional perspective view that illustrates the strain generator of the force sensor device. FIG. 7 is a plan view of the strain generator of the force sensor device.

The coupling portion 240 is part of the strain generator 20, and disposed at a position apart from the force-receiving portion 40 in the Z-axis direction. An upper portion of the strain generator 20 relative to the coupling portion 240 is covered with the cover 50, as described above.

The strain generator 20 includes: the above-described coupling portion 240; a block body 28 disposed above the coupling portion 240, where the block body 28 becomes a sensor chip-mounting portion that mounts the sensor chip 110; a plurality of columns 22a to 22d disposed around the block body 28; and a plurality of beams 23a to 23d that couple the columns 22a to 22d to each other.

The plurality of columns 22a to 22d are disposed so as to be equal (point-symmetric) to the center of the coupling portion 240, as viewed in the Z-axis direction. The columns 22a to 22d project in the Z-axis direction from the coupling portion 240 as a base. The end portions of the columns 22a to 22d on the opposite side to the coupling portion 240 in the Z-axis direction are coupled to each other by the beams 23a to 23d.

The block body 28 is disposed at the center surrounded by the plurality of columns 22a to 22d, as viewed in the Z-axis direction. The block body 28 forms, for example, a square, as viewed in the Z-axis direction. The shape of the block body 28 as viewed in the Z-axis direction is not limited to a square, and may be another polygon or be circular. The thickness of the block body 28 is larger than the thickness of the columns 22a to 22d. The length of the block body 28 in the Z-axis direction is shorter than the length of the columns 22a to 22d.

The block body 28 is disposed at a position apart from the coupling portion 240 in the Z-axis direction. The block body 28 is coupled to the plurality of columns 22a to 22d via a plurality of coupling beams 28a to 28d that extend radially of an imaginary circle, as viewed in the Z-axis direction. The coupling beams 28a to 28d couple the corners of the block body 28 and the plurality of columns 22a to 22d facing the corners, as viewed in the Z-axis direction.

The coupling beams 28a to 28d may be coupled to positions lower than the middle positions of the columns 22a to 22d in the Z-axis direction. The widths and the thicknesses of the coupling beams 28a to 28d are smaller than those of the columns 22a to 22d and the beams 23a to 23d. This makes it possible to reduce the rigidity of the coupling beams 28a to 28d as compared to the rigidity of the columns 22a to 22d and the beams 23a to 23d.

The plurality of beams 23a to 23d include portions that project towards the opposite side to the coupling portion 240 in the Z-axis direction. The plurality of beams 23a to 23d project towards the opposite side to the coupling portion 240 more than the plurality of columns 22a to 22d. Input portions 24a to 24d are formed on the faces of the beams 23a to 23d on the opposite side to the coupling portion 240 in the Z-axis direction. The input portions 24a to 24d are disposed at the positions the closest to the force-receiving portion 40 and the positions the farthest from the coupling portion 240, in the Z-axis direction. The input portions 24a to 24d are disposed at the middle positions of the plurality of columns 22a to 22d next to each other, as viewed in the Z-axis direction.

The strain generator 20 includes a plurality of beams 26a to 26d that extend radially inwardly from the plurality of beams 23a to 23d. The plurality of beams 26a to 26d extend to positions that overlap the block body 28, as viewed in the Z-axis direction. The tip-end portions of the plurality of beams 23a to 23d are provided with a plurality of first contact portions 27a to 27d. The plurality of first contact portions 27a to 27d include contact faces that are to contact the sensor chip 110. The plurality of first contact portions 27a to 27d are coupled to the input portions 24a to 24d via the plurality of beams 26a to 26d. The plurality of first contact portions 27a to 27d are disposed at positions that overlap the block body 28, as viewed in the Z-axis direction. The plurality of first contact portions 27a to 27d are spaced from the block body 28 in the Z-axis direction. The plurality of first contact portions 27a to 27d are disposed on the opposite side of the block body 28 to the coupling portion 240 in the Z-axis direction.

The block body 28 is provided with a plurality of second contact portions 25a to 25e that project towards the opposite side to the coupling portion 240 in the Z-axis direction. The plurality of second contact portions 25a to 25e include faces that are to contact the sensor chip 110. The second contact portion 25e is disposed at the center of the block body 28 as viewed in the Z-axis direction. The plurality of second contact portions 25a to 25d are disposed at positions corresponding to the corners of the block body 28, as viewed in the Z-axis direction. The plurality of first contact portions 27a to 27d are disposed between the plurality of second contact portions 25a to 25d in the X-axis direction and the Y-axis direction.

In the force sensor device 1, in response to the application of a load to the force-receiving portion 40, a relative displacement is generated between the plurality of first contact portions 27a to 27d that are to contact the sensor chip 110, and the plurality of second contact portions 25a to 25e. The sensor chip 110 detects the relative displacement between the plurality of first contact portions 27a to 27d and the plurality of second contact portions 25a to 25e, and detects (can detect) the force Fx, the force Fy, the force Fz, the moment Mx, the moment My, and the moment Mz.

(Surface Roughness Sa of the Contact Face)

Next, description will be given to the surface roughness Sa of the contact face 44 of the force-receiving portion 40 and the surface roughness Sa of the contact face 244 of the coupling portion 240. The surface roughness Sa is an arithmetic average surface roughness Sa. The surface roughness Sa of the contact face 44 of the force-receiving portion 40 may be 3.0 or higher. The surface roughness Sa of the contact face 44 may be 3.1 or higher. The surface roughness Sa of the contact face 44 may be 3.12 or higher.

The surface roughness Sa of the contact face 244 of the coupling portion 240 may be 3.0 or higher. The surface roughness Sa of the contact face 244 may be 3.1 or higher. The surface roughness Sa of the contact face 244 may be 3.12 or higher. As a machining method for the surface roughness Sa of the contact faces 44 and 244, GC lap machining or surface grinding can be performed.

(Effects of the Force Sensor Device)

According to the above-described force sensor device 1, since the surface roughness Sa of the contact face 44 is a value of 3.0 or higher, when a load is applied to the force-receiving portion 40, sliding of the contact face 44 to the first coupling counterpart 61 can be prevented. Thereby, the force sensor device 1 is prevented from outputting a smaller value than an actual value when outputting the moment Mz around the Z axis.

Also, according to the force sensor device 1, since the surface roughness Sa of the contact face 244 is a value of 3.0 or higher, when a load is applied to the force-receiving portion 40, sliding of the contact face 244 to the second coupling counterpart 62 can be prevented. Thereby, the force sensor device 1 is prevented from outputting a smaller value than an actual value when outputting the moment Mz around the Z axis.

(Relationship Between the Surface Roughness Sa of the Contact Face and the Linearity of the Moment Mz)

Figure 8:
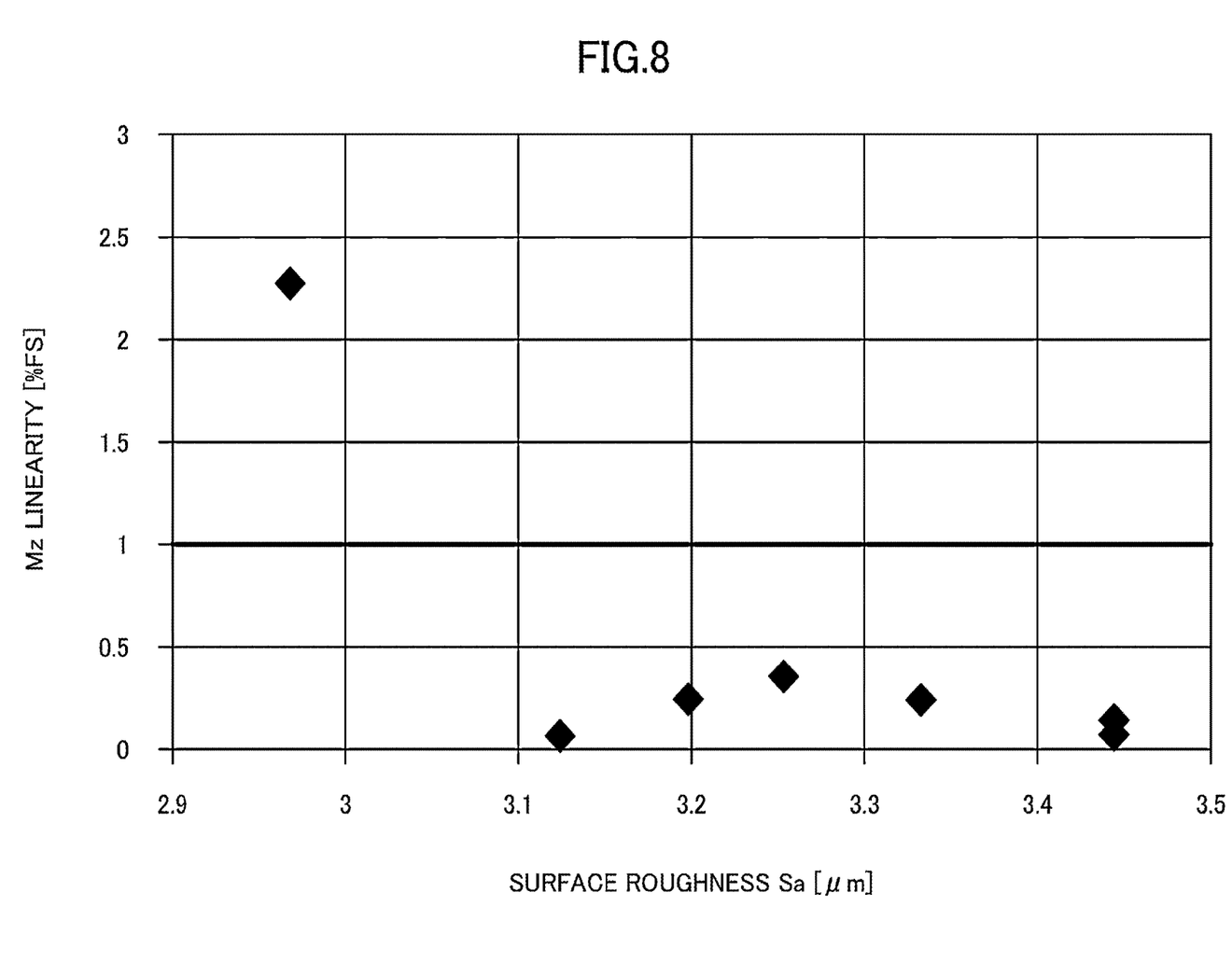
FIG. 8 is a graph that illustrates a relationship between surface roughness Sa and Mz linearity.

Next, description will be given to a relationship between the surface roughness Sa of the contact faces 44 and 244 and the linearity of the moment Mz. FIG. 8 is a graph that illustrates the relationship between the surface roughness Sa and the Mz linearity. FIG. 8 illustrates the surface roughness Sa (μm) as a horizontal axis and the linearity of the moment Mz (% FS) as a vertical axis.

For example, when the surface roughness Sa is 3.0 or higher, the linearity of the moment Mz is 1.0% FS or less. When the surface roughness Sa is 3.1 or higher, the linearity of the moment Mz is 1.0% FS or less. When the surface roughness Sa is 3.12 or higher, the linearity of the moment Mz is 1.0% FS or less.

When the surface roughness Sa is lower than 3.0, the linearity of the moment Mz is more than 1.0% FS. When the surface roughness Sa is lower than 3.0, the linearity of the moment Mz is more than 2.0% FS.

(Measurement Method of the Surface Roughness Sa)

The surface roughness Sa was measured using VR-6000 one-shot 3D-profilometer from KEYENCE CORPORATION. The measurement was performed twice or more for each of the contact faces, followed by calculation of an average.

According to the disclosed technique, it is possible to increase stability of detection precision of the moment Mz.

Although the preferable embodiments have been described in detail, the present invention is not limited to the above-described embodiments, and modifications and variations may be made without departing from the scope of claims.

What is claimed is:

1. A force sensor device, which is to be coupled to a first coupling counterpart in a direction of a predetermined axis, the force sensor device comprising:
    a sensor chip that is to detect a moment around the predetermined axis; and
    a first coupling portion including a first contact face, where the first contact face is to face the first coupling counterpart in the direction of the predetermined axis and is to contact the first coupling counterpart,
    wherein an arithmetic average surface roughness Sa of the first contact face is 3.0 µm or higher.

2. The force sensor device according to claim 1, wherein the arithmetic average surface roughness Sa of the first contact face is 3.1 µm or higher.

3. The force sensor device according to claim 2, wherein:
    the sensor chip is configured to detect forces in directions of an X axis, a Y axis, and a Z axis that cross each other, and a moment around each of the axes; and
    the direction of the predetermined axis is a direction in which the Z axis extends.

4. The force sensor device according to claim 1, wherein the arithmetic average surface roughness Sa of the first contact face is 3.12 µm or higher.

5. The force sensor device according to claim 4, wherein:
    the sensor chip is configured to detect forces in directions of an X axis, a Y axis, and a Z axis that cross each other, and a moment around each of the axes; and
    the direction of the predetermined axis is a direction in which the Z axis extends.

6. The force sensor device according to claim 1, further comprising:
    a second coupling portion including a second contact face, where the second contact face is to face a second coupling counterpart spaced from the first coupling counterpart in the direction of the predetermined axis and is to contact the second coupling counterpart,
    wherein an arithmetic average surface roughness Sa of the second contact face is 3.0 µm or higher.

7. The force sensor device according to claim 6, wherein the arithmetic average surface roughness Sa of the second contact face is 3.12 µm or higher.

8. The force sensor device according to claim 7, wherein:
    the sensor chip is configured to detect forces in directions of an X axis, a Y axis, and a Z axis that cross each other, and a moment around each of the axes; and
    the direction of the predetermined axis is a direction in which the Z axis extends.

9. The force sensor device according to claim 6, wherein:
    the sensor chip is configured to detect forces in directions of an X axis, a Y axis, and a Z axis that cross each other, and a moment around each of the axes; and
    the direction of the predetermined axis is a direction in which the Z axis extends.

10. The force sensor device according to claim 6, wherein the arithmetic average surface roughness Sa of the second contact face is 3.1 µm or higher.

11. The force sensor device according to claim 10, wherein:
    the sensor chip is configured to detect forces in directions of an X axis, a Y axis, and a Z axis that cross each other, and a moment around each of the axes; and
    the direction of the predetermined axis is a direction in which the Z axis extends.

12. The force sensor device according to claim 1, wherein:
    the sensor chip is configured to detect forces in directions of an X axis, a Y axis, and a Z axis that cross each other, and a moment around each of the axes; and
    the direction of the predetermined axis is a direction in which the Z axis extends.

* * * * *